(12) United States Patent
Nilsson et al.

(10) Patent No.: US 11,840,275 B2
(45) Date of Patent: Dec. 12, 2023

(54) METHOD FOR STEERING AN ARTICULATED VEHICLE

(71) Applicant: VOLVO TRUCK CORPORATION, Gothenburg (SE)

(72) Inventors: Peter Nilsson, Hovås (SE); Leo Laine, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 282 days.

(21) Appl. No.: 16/633,405

(22) PCT Filed: Aug. 24, 2018

(86) PCT No.: PCT/EP2018/072890
§ 371 (c)(1),
(2) Date: Jan. 23, 2020

(87) PCT Pub. No.: WO2019/038426
PCT Pub. Date: Feb. 28, 2019

(65) Prior Publication Data
US 2021/0155289 A1 May 27, 2021

(30) Foreign Application Priority Data
Aug. 25, 2017 (WO) .................. PCT/EP2017/071443

(51) Int. Cl.
*B62D 15/02* (2006.01)
*B62D 13/00* (2006.01)
(52) U.S. Cl.
CPC ........... *B62D 15/025* (2013.01); *B62D 13/00* (2013.01)

(58) Field of Classification Search
CPC .............................. B62D 15/025; B62D 13/00
See application file for complete search history.

(56) References Cited

U.S. PATENT DOCUMENTS

| 7,168,661 B1 * | 1/2007 | Fox | B60D 1/465 |
| | | | 246/182 R |
| 8,650,004 B2 * | 2/2014 | Carrasco | G06F 30/15 |
| | | | 703/1 |

(Continued)

FOREIGN PATENT DOCUMENTS

| CN | 104890671 A | 9/2015 |
| CN | 106354160 A | 1/2017 |

(Continued)

OTHER PUBLICATIONS

Martini et al., Lateral control of Tractor-Trailer Vehicles, 2003, IEEE, pp. 269-273 (Year: 2003).*

(Continued)

*Primary Examiner* — Sze-Hon Kong
(74) *Attorney, Agent, or Firm* — Venable LLP; Jeffri A. Kaminski

(57) ABSTRACT

A method for steering an articulated vehicle traveling on a road, the vehicle comprising a tractor and a trailer, the method comprising determining a position of the tractor in relation to the road, and adjusting the steering in dependence on the determined tractor position. The method further comprises determining an orientation of the trailer in relation to the road, and/or an angular velocity of the trailer in relation to the road, and adjusting the steering in dependence on the determined trailer orientation and/or the determined angular velocity.

14 Claims, 6 Drawing Sheets

(56) References Cited

U.S. PATENT DOCUMENTS

| | | | | |
|---|---|---|---|---|
| 9,081,385 | B1* | 7/2015 | Ferguson | G06V 20/588 |
| 9,527,528 | B1* | 12/2016 | Harrison | B60W 30/09 |
| 9,573,589 | B2* | 2/2017 | Tagesson | B60W 30/02 |
| 10,994,729 | B2* | 5/2021 | Berntorp | G08G 1/167 |
| 2002/0095251 | A1* | 7/2002 | Oh | B60T 8/246 |
| | | | | 701/41 |
| 2002/0107627 | A1* | 8/2002 | Funke | B60T 8/1708 |
| | | | | 701/50 |
| 2003/0167107 | A1* | 9/2003 | Guesdon | B62D 13/04 |
| | | | | 701/1 |
| 2008/0208424 | A1* | 8/2008 | Hartman | B60T 8/1708 |
| | | | | 701/70 |
| 2009/0236823 | A1 | 9/2009 | Prem et al. | |
| 2010/0191421 | A1* | 7/2010 | Nilsson | B62D 6/003 |
| | | | | 701/41 |
| 2012/0029782 | A1 | 2/2012 | Suda | |
| 2013/0027195 | A1* | 1/2013 | Van Wiemeersch | G08G 1/167 |
| | | | | 340/431 |
| 2013/0261840 | A1* | 10/2013 | Miyata | G06F 17/00 |
| | | | | 701/1 |
| 2014/0131977 | A1* | 5/2014 | Yamashiro | G08G 1/165 |
| | | | | 280/426 |
| 2014/0176716 | A1* | 6/2014 | Wallat | B60W 30/12 |
| | | | | 348/148 |
| 2014/0303847 | A1 | 10/2014 | Lavoie | |
| 2015/0165850 | A1* | 6/2015 | Chiu | B60D 1/30 |
| | | | | 701/1 |
| 2016/0107682 | A1* | 4/2016 | Tan | G05D 1/0212 |
| | | | | 701/41 |
| 2016/0137224 | A1* | 5/2016 | You | B62D 6/003 |
| | | | | 701/41 |
| 2016/0229394 | A1* | 8/2016 | Fujii | B60T 8/17554 |
| 2017/0043780 | A1* | 2/2017 | Yoon | B60W 10/20 |
| 2017/0169703 | A1* | 6/2017 | Carrasco | G08G 1/166 |
| 2017/0183035 | A1* | 6/2017 | Patana | G08G 1/167 |
| 2017/0247032 | A1* | 8/2017 | Lee | B62D 15/021 |
| 2017/0247054 | A1* | 8/2017 | Lee | B62D 13/00 |
| 2017/0341583 | A1* | 11/2017 | Zhang | H04N 7/181 |
| 2017/0349213 | A1* | 12/2017 | Abdel-Rahman | B62D 15/025 |
| 2018/0121742 | A1* | 5/2018 | Son | G01C 21/28 |
| 2018/0154726 | A1* | 6/2018 | Fida | B60G 17/017 |
| 2018/0229701 | A1* | 8/2018 | Tudosie | B60W 10/20 |
| 2018/0362026 | A1* | 12/2018 | Heimberger | B62D 13/06 |
| 2019/0056736 | A1* | 2/2019 | Wood | G05D 1/0246 |
| 2020/0026305 | A1* | 1/2020 | Maekawa | G05D 1/0274 |
| 2020/0150686 | A1* | 5/2020 | Wieschemann | G05D 1/0291 |
| 2020/0241563 | A1* | 7/2020 | Van Der Knaap | B60W 30/12 |

FOREIGN PATENT DOCUMENTS

| | | |
|---|---|---|
| CN | 107082071 A | 8/2017 |
| EP | 2188168 A1 | 5/2010 |
| WO | 2009022947 A1 | 2/2009 |
| WO | 2013133752 A1 | 9/2013 |

OTHER PUBLICATIONS

China Office Action dated Dec. 3, 2021 in corresponding China Patent Application No. 201880054075.4, 7 pages.

International Search Report and Written Opinion in corresponding International Application No. PCT/EP2018/072890 dated Nov. 14, 2018 (9 pages).

International Preliminary Report on Patentability in corresponding International Application No. PCT/EP2018/072890 dated Oct. 29, 2019 (8 pages).

Siavash Taheri; "Steering Control Characteristics of Human Driver Coupled with an Articulated Commercial Vehicle"; A Thesis In the Department of Mechanical and Industrial Engineering; Concordia University, Montreal, Quebec, Canada; Jan. 2014 (267 pages).

* cited by examiner

METHOD FOR STEERING AN ARTICULATED VEHICLE

CROSS-REFERENCE TO RELATED APPLICATIONS

This application is a U.S. National Stage application of PCT/EP2018/072890, filed Aug. 24, 2018 and published on Feb. 28, 2019 as WO 2019/038426, which claims the benefit of International Patent Application No. PCT/EP2017/071443, filed Aug. 25, 2017, all of which are hereby incorporated by reference in their entireties.

TECHNICAL FIELD

The invention relates to a method for steering an articulated vehicle traveling on a road, the vehicle comprising a tractor and a trailer. The invention also relates to a computer program, a computer readable medium, a control unit, and a vehicle.

The invention can be applied in heavy-duty vehicles, such as trucks. Although the invention will be described with respect to trucks, the invention is not restricted to this particular vehicle, but may also be used in other vehicles such as cars with trailers.

BACKGROUND

Driving a heavy articulated vehicle may be a challenging task. Difficulties may be caused by the vehicle size and weight, the vehicle dynamics in the longitudinal and lateral directions, and the possible safety impact in case of an accident.

It is known to provide models, to be stored accessible to vehicle control units, which may assist drivers or provide automatic driving of vehicles. "Steering control characteristics of human driver coupled with an articulated commercial vehicle", S. Taheri, PhD thesis, Concordia University, 2014, presents a two-stage preview model including a path preview function, using near and far points to manage central lane position and vehicle orientation. The model also includes vehicle orientation and lateral position error, and additional vehicle states. The additional vehicle states are lateral accelerations and yaw rates of the tractor and semi-trailer units, and the articulation angle rate.

A problem with known driver assistance models is that the maneuverability and stability aspects of articulated vehicles are challenging, and low-speed and high speed maneuvering often require different gain factors to achieve good overall performance. Further, the inventors have found that a two-stage preview model resulted in the lateral distance offset of the rearmost vehicle unit being unacceptably large in low speed cornering.

EP2188168B1 relates to a method for supporting lane keeping of a vehicle. It suggests a predictor module estimating the future trajectory of a towing vehicle and a trailer relative to the lane using fused lane data and vehicle sensor data. This method requires a model based predictive control with repetitive calculations of trajectories, which in turn requires a high processing capacity of a control unit for the method.

SUMMARY

An object of the invention is to improve driver assistance functions or automatic driving in articulated vehicles. Another object of the invention is to reduce processing capacity requirements for driver assistance functions or automatic driving in articulated vehicles.

The objects are reached with a method according to claim 1. Thus, the object is reached with a method for steering an articulated vehicle traveling on a road, the vehicle comprising a tractor and a trailer, the method comprising determining a position of the tractor in relation to the road, and adjusting the steering in dependence on the determined tractor position.

The method further comprises determining an orientation of the trailer in relation to the road, and/or an angular velocity of the trailer in relation to the road, and adjusting the steering in dependence on the determined trailer orientation and/or the determined angular velocity.

It should be noted that herein, the word tractor refers to any vehicle which is adapted to pull a trailer. The tractor could be, for example, a truck, a lorry, or a road tractor, or even a car. Further, herein the word trailer refers to any vehicle which is adapted to be pulled by a tractor. The trailer could be, for example, a semi-trailer with or without a dolly, a full-trailer, an A-frame drawbar trailer, or even a travel trailer.

Determining the position of the tractor in relation to the road may comprise determining the orientation and/or the location of the tractor in relation to the road.

The orientation of the trailer in relation to the road may be the angle of the trailer in relation to the road. Determining the orientation of the trailer, in relation to the road, may involve determining a heading angle of the trailer, relative to the road. Thus, the orientation of the trailer may be the heading angle of the trailer. The heading angle of the trailer may be an angle of a longitudinal axis of the trailer.

Thus, embodiments of the invention may comprise determining an orientation of the trailer in relation to the road, instead of an absolute orientation of the trailer, and adjusting the steering in dependence on the determined trailer orientation. Alternatively, or additionally, embodiments of the invention may involve using, for steering adjustments, the angular velocity of the trailer in relation to the road, instead of an absolute angular velocity. Embodiments of the invention improve the tracking performance for both a tractor semi-trailer combination and an A-double combination. In case of low speed maneuvering, at 10-50 km/h, the invention may reduce the lateral distance offset of the rearmost vehicle axle. Also, the invention allows for providing models which are tunable, in terms of simple and understandable parameters.

The invention provides for providing driver assistance functions or automatic driving in articulated vehicles, without the need for predictive control. Instead, merely current values of the of input parameters for the method, such as the trailer orientation, and/or the trailer angular velocity, may be used. Thereby, merely momentary proportional regulation may be used. Thereby, the processing capacity requirements of control units for driver assistance functions or automatic driving in articulated vehicles may be reduced.

Preferably, determining the trailer orientation in relation to the road, and/or the trailer angular velocity in relation to the road, comprises determining a direction of the road at the trailer. The road at the trailer may be understood as the road under the trailer, or in a vicinity of the trailer. Thereby, the trailer orientation in relation to the road, and/or the trailer angular velocity in relation to the road, may be determined in a simple manner.

Preferably, determining the trailer orientation in relation to the road comprises comparing the orientation of the trailer, and the direction of the road at the trailer. Thereby, a control algorithm may be provided, which requires a particularly low computational capacity for the method. In some embodiments, such a comparison may be done as a direct comparison. Such a direct comparison may be done without the use of a fixed coordinate system. For example, an object sensor, such as a trailer mounted camera, may be used for capturing images of the road and the trailer orientation in relation to the road may be determined by image analysis. The determination may then be done without the use of a fixed coordinate system.

Embodiments of the invention may involve determining the direction of the road at the trailer in a fixed coordinate system. This may be done, for example, based on trailer position data, and map data. Thereby, the orientation of the trailer in relation to the fixed coordinate system may be determined. Thus, the trailer orientation in relation to the road may be determined by comparing the orientation of the trailer in the fixed coordinate system, and the direction of the road at the trailer in the fixed coordinate system. Thereby, an accurate determination of the trailer orientation in relation to the road may be obtained, without any requirement for a relatively high computational capacity of a control unit carrying out the method. For example, the orientation of the trailer, in relation to the road, may be determined as an angular difference between the direction of the road at the trailer, in the fixed coordinate system, and the orientation of the trailer, in the fixed coordinate system.

In some embodiments, determining the trailer orientation in relation to the road, and/or the trailer angular velocity in relation to the road, comprises determining a curvature of the road. Thereby, the trailer angular velocity in relation to the road may be determined in a simple manner. For example, embodiments of the invention may involve determining the curvature of the road in a fixed coordinate system. The method may involve determining the curvature of the road at the trailer. Thereby, the angular velocity of the trailer, in relation to the fixed coordinate system, may be determined. Thus, the trailer angular velocity in relation to the road may be determined by comparing the angular velocity of the trailer in the fixed coordinate system, and the curvature of the road at the trailer in the fixed coordinate system.

Preferably, determining the trailer angular velocity in relation to the road comprises comparing the angular velocity of the trailer, with a rate of change of the direction of the road at the trailer. The determination of the trailer angular velocity in relation to the road may comprise comparing the angular velocity of the trailer in a fixed coordinate system, with a rate of change of the direction of the road at the trailer in a fixed coordinate system. The rate of change of the direction of the road at the trailer may be determined based on the curvature of the road at the trailer and the velocity of the trailer. For example, the rate of change of the direction of the road may be determined by dividing the trailer velocity by the curvature, for example expressed as the radius of the road curvature. Determining the trailer angular velocity in relation to the road allows for an accurate control of relatively fast events. For example, the trailer angular velocity in relation to the road may be determined as an angular velocity difference between the rate of change of the direction of the road, and the yaw rate of the trailer.

Preferably, the trailer orientation in relation to the road, and/or the trailer angular velocity in relation to the road, is determined based on signals from an object sensor mounted on the trailer. The object sensor is preferably arranged to detect spatial features externally of the trailer. For example, the object sensor may be arranged to detect spatial features behind and/or laterally of the trailer. The object sensor may be a camera, and the signals may represent at least one image. The camera may face rearwards and/or sideways from the trailer.

Thus, the trailer orientation in relation to the road, and/or the trailer angular velocity in relation to the road, may be determined by analysing images from a sensor or camera facing rearwards and/or sideways.

In some embodiments, the trailer orientation in relation to the road, and/or the trailer angular velocity in relation to the road, is determined based on signals from an object sensor mounted on the tractor. Thereby, the trailer orientation in relation to the road, and/or the trailer angular velocity in relation to the road, may be determined based also on signals from at least one articulation sensor, which articulation sensor signals represent a respective angle of at least one articulated joint between the tractor and the trailer. The object sensor may be arranged to detect spatial features externally of the tractor. For example, the object sensor may be arranged to detect spatial features in front and/or laterally of the tractor. The object sensor may be a camera, and the signals may represent at least one image. The camera may face forwards and/or sideways from the tractor.

In such embodiments, road information may be obtained using a tractor mounted object sensor. One or more articulation sensors may be provided for registering the angle between vehicle parts.

In some embodiments, the tractor orientation in relation to a section of the road at the tractor may be determined. Such a determination may be based on signals from a tractor mounted object sensor. In an example, a point in time of the determination, of the tractor orientation in relation to the road section, may be referred to as a first point in time. The trailer orientation in relation to the tractor, at the first point in time, may be determined based on signals from the one or more articulation sensors. Based on the trailer orientation in relation to the tractor, and the tractor orientation in relation to the road section, the trailer orientation in relation to the road section at the first point in time may be determined. A subsequent point in time, at which the trailer passes the road section at which the tractor orientation in relation to the road section was determined, may be referred to as a second point in time. The change of the trailer orientation in relation to the road section, from the first point in time to the second point in time, may be determined by means of a yaw sensor in the trailer.

The vehicle may comprise a plurality of trailers. Thereby, determining the trailer orientation, and/or the trailer angular velocity, may comprise determining the orientation, in relation to the road, of the rearmost trailer, and/or the angular velocity, in relation to the road, of the rearmost trailer. Thereby, embodiments of the invention may be advantageously used in applications where the vehicle comprises a plurality of trailers. In such applications, the demands on a vehicle driver, due to the nature of the vehicle, may be particularly high.

Preferably, determining a position of the tractor, in relation to the road, comprises determining rates of change of angles between a movement direction of the tractor, and directions to near and far points ahead of the tractor. Thereby, the method may be simple to implement and to adjust to a particular vehicle. It should be noted that determining a position of the tractor in relation to the road may in some embodiments comprise determining angles between a movement direction of the tractor, and directions to near and far points ahead of the tractor. In some embodiments, the position of the tractor in relation to the road may comprise determining an angle, and/or a rate of change of an angle, between on one hand a movement direction of the tractor, and on the other hand a direction to a near point ahead of the tractor, and/or a direction to a far point ahead of the tractor.

The near and far points may be at different distances ahead of the vehicle. The near and far points may represent a centre of a desired position on a road. The near and far points may be obtained by sensor measurements. Said centre may be calculated based on detected lane boundaries, and/or based on a position of a further vehicle in front said vehicle.

It should be noted that the position of the tractor, in relation to the road, may be determined in some other manner. For example, the position of the tractor, in relation to the road, may involve minimising a lateral acceleration, and lateral position and orientation errors between a previewed path of the tractor and an actual path of the tractor, e.g. as in X. Yang, S. Rakheja, and I. Stiharu, "Structure of the driver model for articulated vehicles", International Journal of Heavy Vehicle Systems 9.1 (2002), pp. 27-51, "Adapting an articulated vehicle to its drivers", Transactions-American Society of Mechanical Engineers Journal of Mechanical Design 123.1 (2001), pp. 132-140, and "Study of control characteristics of an articulated vehicle driver", International Journal of Heavy Vehicle Systems 4.2-4 (1997), pp. 373-397.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
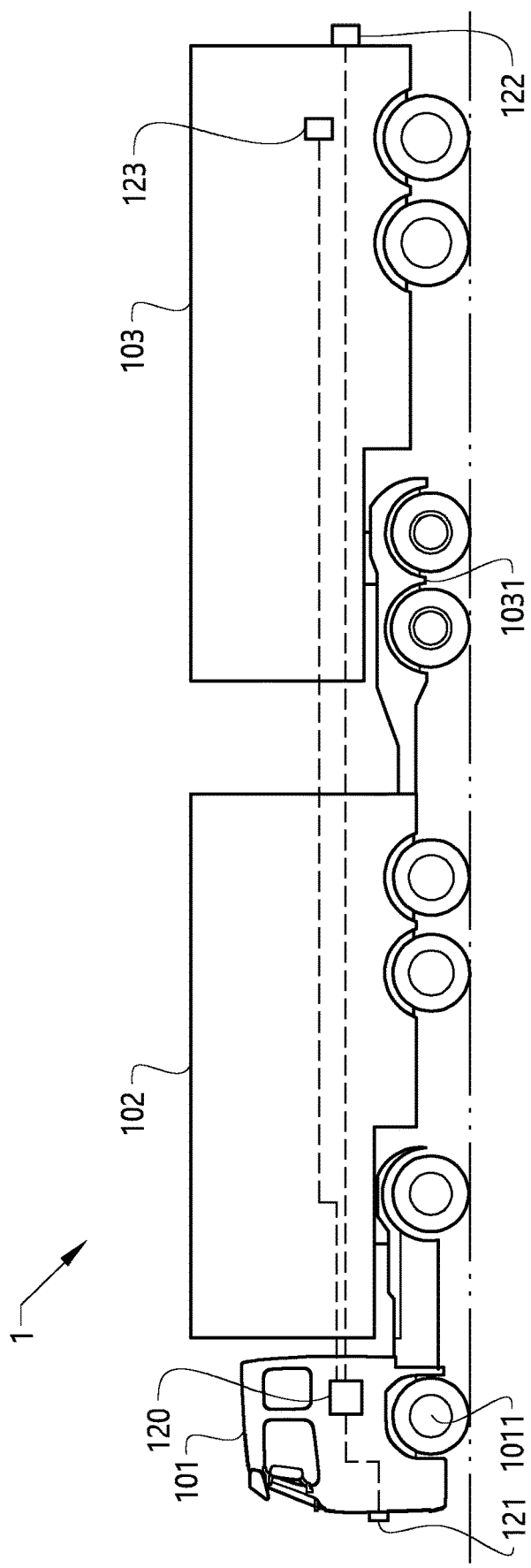
FIG. 1 is a side view of an articulated vehicle with a tractor and two trailers.

FIG. 1 shows an articulated vehicle in the form of a so called A-double combination. The vehicle is herein also referred to as a subject vehicle. The vehicle comprises a tractor 101 in the form of a truck. The vehicle also comprises a forward trailer 102 and a rearmost trailer 103. The rearmost trailer 103 forms part of an A-frame drawbar trailer. The A-frame drawbar trailer comprises the rearmost trailer and a dolly 1031. The dolly 1031 is connected to the forward trailer 102.

It should be noted that the invention is applicable to a variety of alternative articulated vehicles. Thus, the vehicle may comprise more than two trailers. Alternatively, the vehicle may comprise a single trailer, such as in a tractor semitrailer combination.

The vehicle comprises a control unit 120. The control unit 120 is arranged to control a steering angle of two front wheels 1011 of the tractor 101. The control unit steering angle control may be effected by one or more actuators (not shown). The control unit 120 may be arranged to provide an automatic steering function of the vehicle 1. The tractor may comprise a steering wheel (not shown) arranged to be handled by a driver of the vehicle. Thereby, the control unit 120 may be arranged to provide a supporting steering function of the vehicle 1. Such a supporting steering function may be arranged to adjust the steering control by the steering wheel.

The vehicle is provided with a forward object sensor 12. The forward object sensor 121 mounted on the tractor 101. The control unit 120 is arranged to receive signals from the forward object sensor. The forward object sensor 121 is arranged to detect spatial features in front of the tractor 101. In this embodiment, the forward object sensor 121 is a camera. The object sensor could be any suitable kind of camera, e.g. a stereo camera. In some embodiments, the object sensor may be a radar detector. In some embodiments, the vehicle may be provided with a plurality of forward object sensors; e.g. one of the object sensors may be a camera, and another of the object sensors may be a radar detector.

The vehicle is provided with two rearward object sensors 122. The rearward object sensors 122 are mounted on the rearmost trailer 103. The control unit 120 is arranged to receive signals from the rearward object sensors. The rearward object sensors 121 are arranged to detect spatial features laterally of the rearmost trailer 103. In this embodiment, the rearward object sensors 121 are formed by two cameras 122. The cameras are directed in opposite lateral directions.

The vehicle is provided with a yaw rate sensor 123. The yaw rate sensor 123 is mounted on the rearmost trailer 103. The control unit 120 is arranged to receive signals from the yaw rate sensor. The yaw rate sensor 123 is arranged to detect yaw movements, i.e. rotations around a substantially vertical axis of the rearmost trailer 103.

Figure 3:
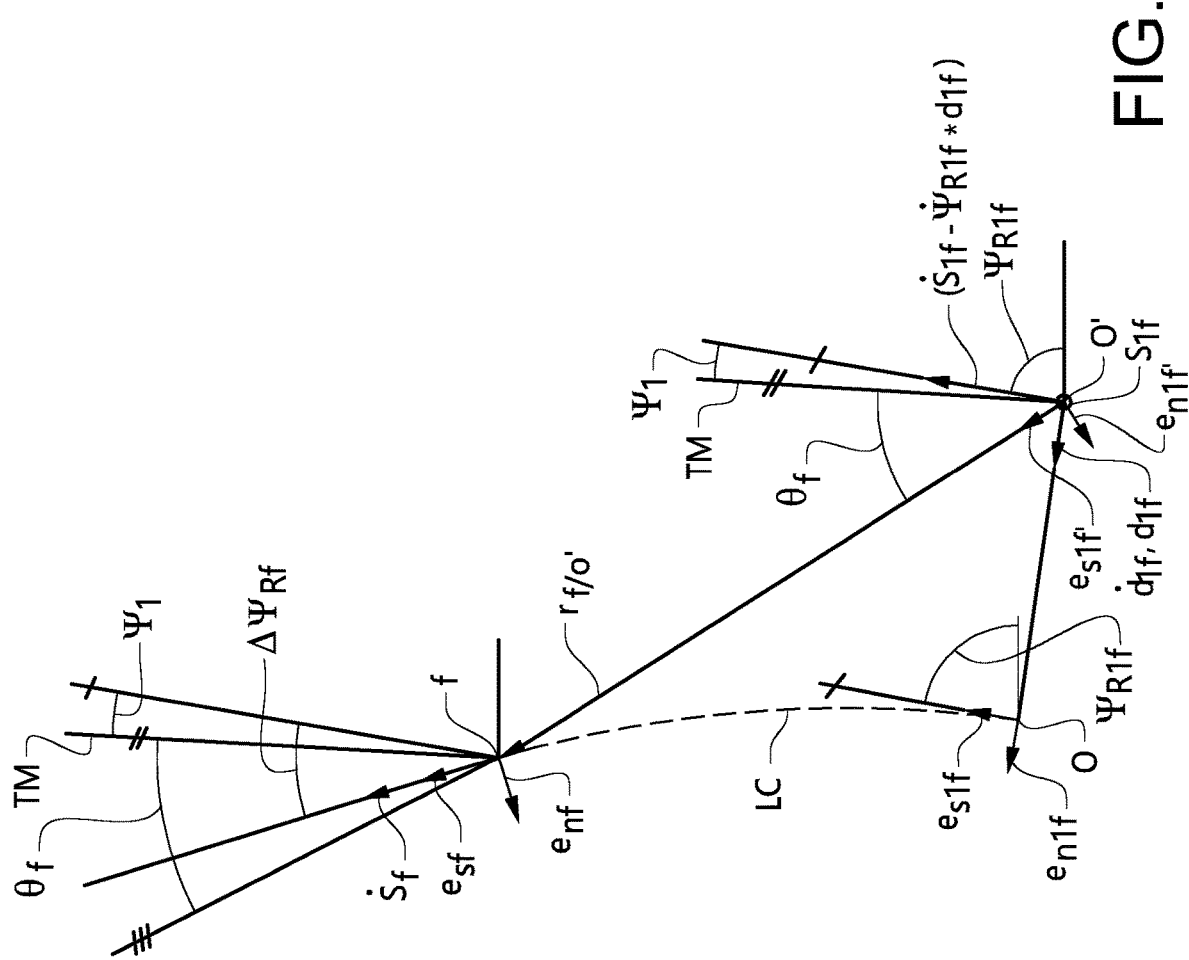
FIG. 3 is a detail of FIG. 2.
Figure 4:
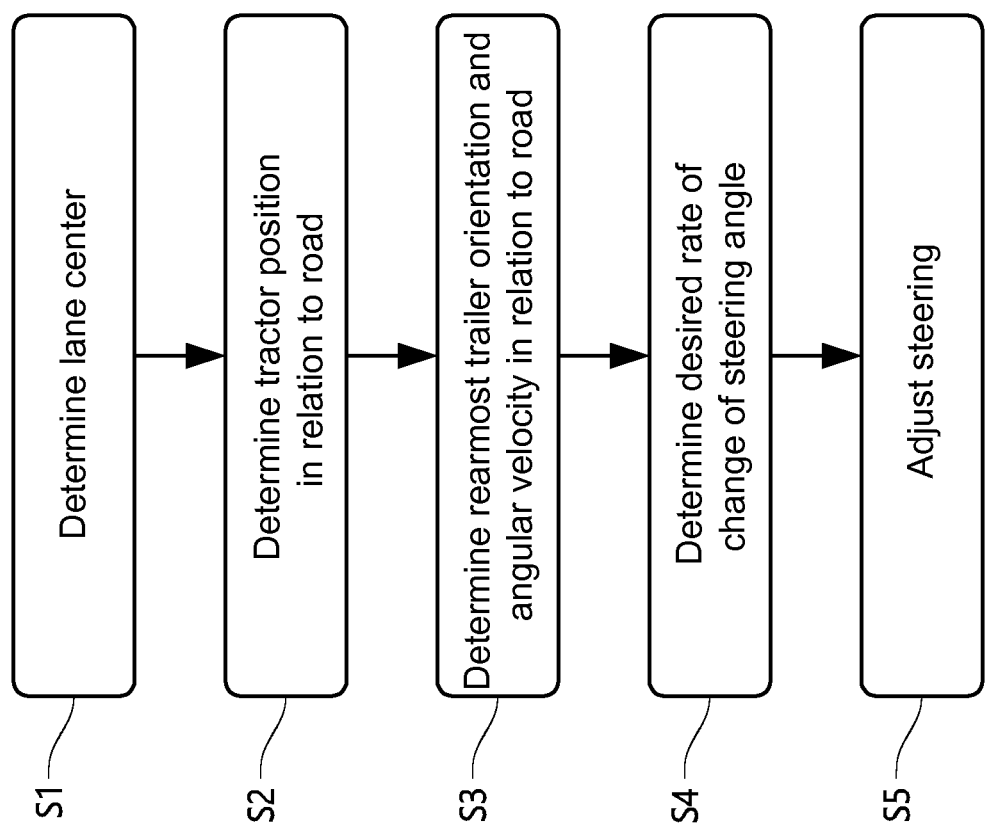
FIG. 4 is a diagram depicting steps in said method.

Below, a method of steering the articulated vehicle, when traveling on a road, is described with reference to FIG. 2-FIG. 4. The method may be used e.g. for lane maintaining maneuvering, lane changes, roadway entrance and exit, ramps, and overtaking. Below, and example involving lane maintaining maneuvering is described.

The method includes determining S1 a line representing the lane centre LC. The lane centre LC is indicated with a broken line in FIG. 2. The lane centre is determined as the vehicle moves. The lane centre may be determined and updated as the vehicle moves. The lane centre LC is determined based at least partly on signals from the forward object sensor 121. Such a determination may include identifying lane edges LEL, LER. Lane edges LEL, LER, indicated in FIG. 2, may be identified e.g. based on image data of the forward object sensor in the form of the camera. Such an identification may include identifying painted lines on the road, curbs, and/or grass or gravel, which indicate lane edges.

The lane centre LC may be determined partly based on one or more predetermined road design features. The road design features may be stored accessible to the control unit 120. The road design features may represent geographical entities based on which the road is designed. The road design features may for example be a straight line, a circular arc, and/or a clothoid. A clothoid is a spiral whose curvature is a linear function of the distance travelled along the spiral.

A road design feature of a stretch of a road on which the vehicle is travelling may be identified based on signals from the forward object sensor 121. A parameter of a road design feature may be determined based on signals from the forward object sensor 121. For example, where a road design feature of a stretch of a road, on which the vehicle is travelling, is assumed to be a circular arc, the radius of the arc may be determined based on signals from the forward object sensor 121.

The method comprises determining S2 a position of the tractor 101 in relation to the road. This determination comprises determining rates of changes of angles θn, θf between a movement direction TM of the tractor 101, and directions sn, sf to near and far points n, f ahead of the tractor 101, indicated in FIG. 2.

The absolute positions of the near point n and far point f are assumed to be located on the lane centre LC. The absolute positions of the near point n and far point f are assumed to be located at the distances sn and sf from the subject vehicle front axle position s1f. The near and far points n, f are ahead of the front axle position s1f.

Similarly to as suggested in pages 125-128 in said PhD thesis "Steering control characteristics of human driver coupled with an articulated commercial vehicle", (S. Taheri), for a straight-line road segment, the near and far points n, f may be located at respective intersection of boundaries of near and far visual fields with the lane centre LC. For a given forward speed, the distances sn, sf from the subject vehicle front axle position s1f to the near and far points may be constant for both straight-line and curved paths. Alternatively, in curved paths the far point f may be located by projecting a tangent line from the subject vehicle front axle position s1f to an inside edge of the lane, the intersection of the tangent line with the lane centre LC being considered as the far point f, similarly to as suggested said PhD thesis.

The rates of changes of the angles θn, θf between the movement direction TM of the tractor 101, and the directions sn, sf to the near and far points n, f are herein also referred to as angular velocities $\dot{\theta}_n$, $\dot{\theta}_f$ of the directions sn, sf to the near and far points n, f.

Below, an example of a calculation of the angular velocity $\dot{\theta}f$ of the direction to the far point sf is provided. A calculation of the angular velocity $\dot{\theta}n$ of the direction to the near point sn may be similar.

The absolute velocity $\dot{s}f$ of the far point f can be described with a vector vf as $$vf=(\dot{s}f\cos(\theta f+\psi 1-\Delta\psi Rf))\cdot es1f-(\dot{s}f\sin(\theta f+\psi 1-\Delta\psi Rf))\cdot en1f \quad (1)$$

$$\Delta\psi Rf=\psi Rf-\psi R1f \quad (2)$$

where es1f and en1f are unit vectors, and ψR1f and ψRf are the road angles at the subject vehicle front axle position s1f and the far point position f, respectively. ψ1 is the yaw angle of the tractor 101, relative to the road.

The absolute velocity of point f may be described in the moving coordinate frame (s1f; n1f; b1f) as $$vf=((\dot{s}1f-\dot{\Psi}R1f\cdot d1f)\cdot\cos(\theta f+\psi 1)+\dot{d}1f\sin(\theta f+\psi 1)+\dot{r}f/o')\cdot es1f+(-(\dot{s}1f-R1f\cdot d1f)\cdot\sin(\theta f+\psi 1)+\dot{d}1f\cos(\theta f+\psi 1)+(\dot{\theta} f+\dot{\Psi}1)\cdot rf/o')\cdot en1f \quad (3)$$

where $\dot{s}1f$ and $\dot{d}1f$ are the velocities of the subject vehicle front axle, in the road coordinate frame (s1f; n1f; b1f). The centre o of the road coordinate frame is on the lane centre LC, and moves along with the vehicle. $\dot{\Psi}R1f$ and $\dot{\Psi}1$ are the angular velocity of the road at the subject vehicle front axle position s1f, and the angular velocity of the tractor 101, respectively. d1f is the subject vehicle front axle position perpendicular to the road tangent. $\dot{r}f/o'$ and rf/o' are the velocity and position of the far point f in the moving coordinate frame.

By combining (1)-(3), the velocity $\dot{r}f/o'$ of point f and the angular velocity $\dot{\theta}f$ of the direction sf to the far point f can be described as $$\dot{\theta}f=(-\dot{s}f\sin(\theta f+\psi 1-\Delta\psi Rf)+(\dot{s}1f-\dot{\Psi}R1f\cdot d1f)\cdot\sin(\theta f+\psi 1))/rf/o'-d1f\cos(\theta f+\psi 1)/rf/o'-\dot{\Psi}1 \quad (4)$$

$$\dot{r}f/o'=\dot{s}f\cos(\theta f+\psi 1-\Delta\psi Rf)-((\dot{s}1f-\dot{\Psi}R1f\cdot d1f)\cdot\cos(\theta f+\psi 1)-\dot{d}1f\sin(\theta f+\psi 1)) \quad (5)$$

In some embodiments, equation (4) may be simplified. By assuming a circular road section and equal velocities $\dot{s}f$, $\dot{s}1f$ of the far point f and the subject vehicle front axle s1f, the length of the vector rf/o', indicating the position of the far point f in the moving coordinate frame, becomes constant. Thereby, $$\Delta\psi Rf=sf\cdot ch \quad (6)$$

where ch is the horizontal curvature of the road. Assuming θf, ψ1 and ΔψRf are small angles, and ignoring products of vehicle states (vyv1f·ψ1 and d1f ∩ψ1), equation (4) can be written as $$\dot{\theta}f=(-vyv1f-vxv1f(\psi 1+sf\cdot ch))/rf/o'-\dot{\Psi}1 \quad (7)$$

vyv1f and vxv1f are velocity components of the vehicle front axle, along the lane centre LC and transverse to the lane centre LC, respectively. $\dot{\theta}f$ represents the rate of change of the angle θf between the tractor movement direction TM, and the direction sf to the far point f. As mentioned, the rate of change $\dot{\theta}n$ of the angle θn between the tractor movement direction TM, and the direction sn to the near point n may be determined in a similar manner. In this embodiment, the position of the tractor 101 in relation to the road is represented by the angle θn between the tractor movement direction TM, and the direction sn to the near point n, and the determined rates of changes $\dot{\theta}f$, $\dot{\theta}n$ of the angles θn, θf between the tractor movement direction TM, and the directions sn, sf to the near and far points n, f.

Figure 2:
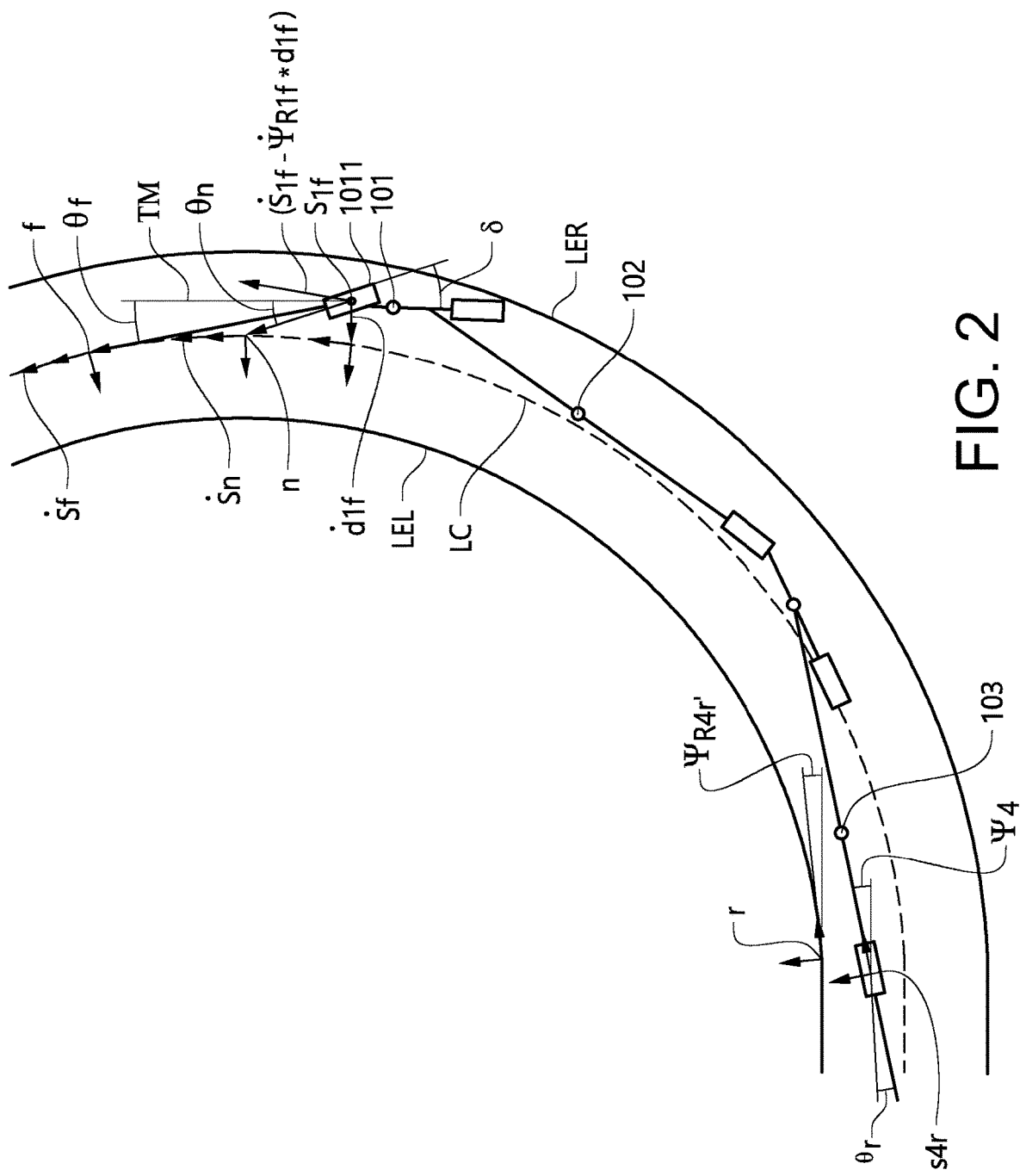
FIG. 2 is a diagram schematically depicting the vehicle in FIG. 1, when travelling through a curve of a road, and indicating parameters used in a method according to an embodiment of the invention.

The method comprises determining S3 an orientation θr, indicated in FIG. 2, of the rearmost trailer 103, in relation to the road. The method comprises determining an angular velocity of the rearmost trailer 103 in relation to the road.

Determining the trailer orientation θr in relation to the road, and the trailer angular velocity in relation to the road, comprises determining the yaw angle ψ4 and the yaw rate $\dot{\Psi}$4 of the rearmost trailer, illustrated in FIG. 2. The yaw angle ψ4 and the yaw rate $\dot{\Psi}$4 of the rearmost trailer may be determined based on signals from the yaw rate sensor 223 in the rearmost trailer.

Alternatively, the yaw angle ψ4 and the yaw rate $\dot{\Psi}$4 of the rearmost trailer may be determined based on signals from a yaw rate sensor in the tractor 101, and based on signals from articulation sensors in articulated joints connecting the rearmost trailer 103 to the dolly 1031, the dolly 1031 to the forward trailer 102, and the forward trailer 102 to the tractor 101.

Determining the trailer orientation r in relation to the road, and the trailer angular velocity in relation to the road $\dot{\Psi}$R4r'–$\dot{\Psi}$4, comprises determining a direction ψR4r' of the road at the trailer 103. As illustrated in FIG. 2, the angle of the road ψR4r', at a rear point r, in relation to a fixed coordinate system, and the rate of change $\dot{\Psi}$R4r' of the angle of the road ψR4r' in relation to the fixed coordinate system, are determined. The rear point r is determined, by means of the rear object sensor, to be positioned on an inner edge LEL of the lane, and to move along with the vehicle.

The orientation r of the rearmost trailer 103, in relation to the road, is determined as $$\theta r = \psi R4r' - \psi 4 \quad (8)$$

The angular velocity of the rearmost trailer 103 in relation to the road is determined as $$\dot{\theta}r = \dot{\psi} R4r' - \dot{\psi} 4 \quad (9)$$

The steering angle δ, indicated in FIG. 2, of the tractor front wheels 1011 are adjusted based on the position of the tractor 101 in relation to the road θf, θn, θn, as well as the orientation θr of the rearmost trailer 103 in relation to the road, and the angular velocity θ̇r of the rearmost trailer 103 in relation to the road. In this embodiment, a desired rate of change δ̇ of the steering angle δ is determined S4 as $$\dot{\delta} = kf \cdot \dot{\theta}f + kn \cdot \dot{\theta}n + knl \cdot \theta n + kr \cdot \dot{\theta}r + krl \cdot \theta r \quad (10)$$

where kf, kn, knl, kr and krl are gain factors.

Thus, θr is an error which provides, with an increasing size, an increased desired rate of change δ̇ of the steering angle. θ̇r is an error which provides, with an increasing size, an increased desired rate of change δ̇ of the steering angle. Thereby, the steering is adjusted S5 in dependence on the determined trailer orientation and/or angular velocity. In some embodiments, either the orientation r of the trailer in relation to the road, or the angular velocity θ̇r of the trailer in relation to the road may be determined.

The desired steering angle change rate δ̇ may be used in a fully automatic steering function. Alternatively, the desired steering angle change rate δ̇ may be used for correcting manual steering actions by a driver of the vehicle. For example, when the actual steering angle change rate, provided as a result of the driver's manual steering actions, differ from the desired steering angle change rate δ̇ by more than a threshold differentiation, an automatic steering function may override the manual steering actions.

In some embodiments, the orientation θr of the rearmost trailer 103 in relation to the road, and the angular velocity θ̇r of the rearmost trailer 103 in relation to the road may be determined based on a determined curvature of the road.

Above, embodiments of the invention have been described as used for maintaining the vehicle in a lane of a road. As suggested, the invention may also be applicable to other types of driving situations. For example, embodiment of the invention may be used to assist a vehicle driver in a lane changing manoeuvre, or to automatically perform such a manoeuvre.

Figure 5:
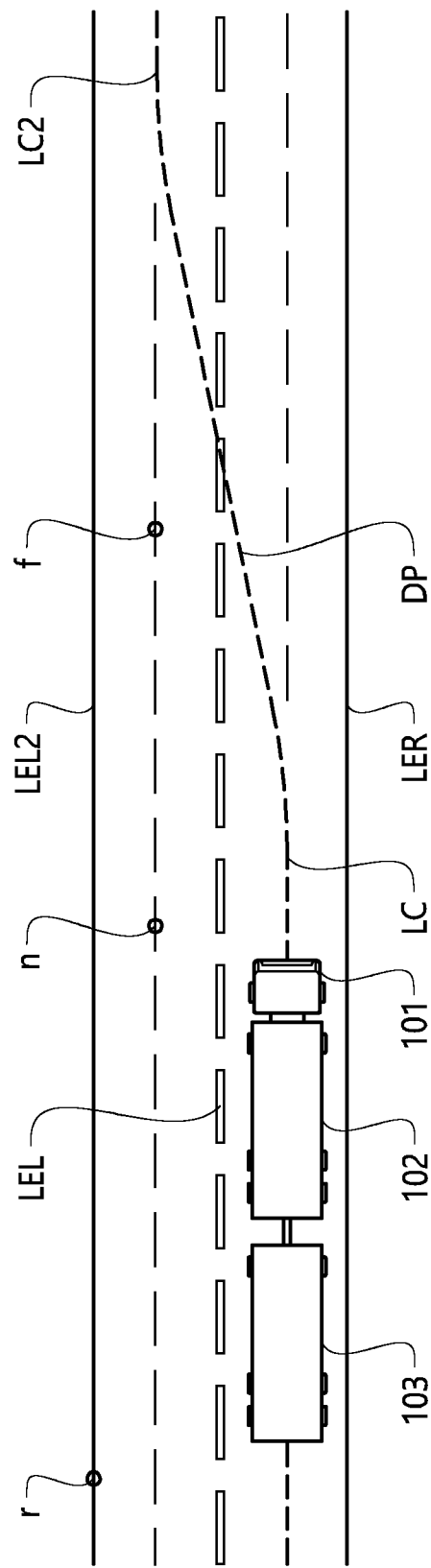
FIG. 5 shows a top view of the vehicle in FIG. 1, and a stretch of a road on which the vehicle is travelling.

Reference is made to FIG. 5. For a lane changing manoeuvre, the method described above with reference to FIG. 1-FIG. 4 may include identifying boundaries LEL, LEL2 of a lane, adjacent to a lane in which the vehicle is travelling. Such an identification may be done based, at least partly, on signals from the forward object sensor 121, (FIG. 1). The identification may include identifying lane edges of the adjacent lane. Lane edges may be identified e.g. based on image data of the camera formed by the forward object sensor. The method may include determining a line representing the centre LC2 of the adjacent lane. The actual track of the vehicle front axle during the lane change is in FIG. 5 indicated with the broken lime DP.

The method may comprise determining, during the lane change, a position of the tractor 101 in relation to the centre LC2 of the adjacent lane. This determination may comprise determining rates of changes of angles between a movement direction of the tractor, and directions to a near point n and a far point f ahead of the tractor. The absolute positions of the near point n and far point f may be assumed to be located on the centre LC2 of the adjacent lane.

The method may advantageously comprise determining, during the lane change, an orientation of the rearmost trailer 103 in relation to the road, and determining an angular velocity of the rearmost trailer 103 in relation to the road. Such determinations may involve determining an orientation of the rearmost trailer 103 in relation to the road. Thereby, similarly to what has been described above, the yaw angle and the yaw rate of the rearmost trailer are determined, e.g. based on signals from a yaw rate sensor in the rearmost trailer. Further, a direction of the road at the trailer 103 is determined.

In this example, the angle of the road, at a rear point r, in relation to a fixed coordinate system, and the rate of change of the angle of the road in relation to the fixed coordinate system, are determined. The rear point r is determined, by means of a rear object sensor (not shown), mounted to the trailer, to be positioned on one of the boundaries LEL2 of the adjacent lane, and to move along with the vehicle.

The orientation of the rearmost trailer 103, in relation to the road, is determined based on the determined yaw angle of the rearmost trailer, and on the determined direction of the road at the trailer 103, similarly to what has been described above with reference to FIG. 2. The angular velocity of the rearmost trailer 103 in relation to the road is determined based on the determined yaw rate of the rearmost trailer, and on the determined rate of change of the angle of the road in relation to the fixed coordinate system, similarly to what has been described above with reference to FIG. 2.

Figure 6:
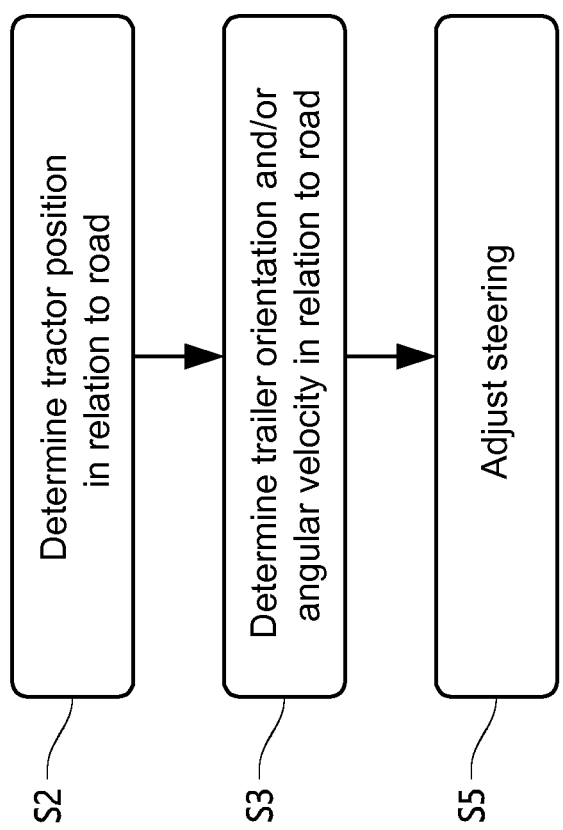
FIG. 6 is a diagram depicting steps in a method according to an alternative embodiment of the invention.

FIG. 6 depicts steps in a method according to a further embodiment of the invention. The method provides for steering an articulated vehicle traveling on a road. The articulated vehicle could be of any kind, e.g. as described above with reference to FIG. 1. The vehicle comprises a tractor and a trailer. The method comprises determining S2 a position of the tractor 101 in relation to the road. The method also comprises determining S3 an orientation of the trailer in relation to the road, and/or an angular velocity of the trailer in relation to the road. The steering of the articulated vehicle is adjusted S5 in dependence on the determined tractor position, and in dependence on the determined trailer orientation and/or the determined angular velocity.

It is to be understood that the present invention is not limited to the embodiments described above and illustrated in the drawings; rather, the skilled person will recognize that many changes and modifications may be made within the scope of the appended claims.

The invention claimed is:

1. A method for steering an articulated vehicle traveling on a road, the vehicle comprising a tractor and a trailer, the method comprising: determining a position of the tractor in relation to the road, and adjusting the steering of the tractor in dependence on the determined tractor position; determining an orientation of the trailer in relation to the road, and/or determining an angular velocity of the trailer in relation to the road, wherein determining the trailer orientation in relation to the road comprises comparing the orientation of the trailer and the direction of the road at the trailer, and wherein determining the trailer angular velocity in relation to the road comprises comparing the angular velocity of the trailer with a rate of change of the direction of the road at the trailer; and adjusting the steering of the tractor in dependence on the determined trailer orientation and/or the determined angular velocity of the trailer.

2. The method according to claim 1, wherein determining the trailer orientation in relation to the road comprises comparing the orientation of the trailer in a fixed coordinate system, and the direction of the road at the trailer in a fixed coordinate system.

3. The method according to claim 1, wherein determining the trailer orientation in relation to the road, and/or the trailer angular velocity in relation to the road, comprises determining a curvature of the road.

4. The method according to claim 1, wherein the trailer orientation in relation to the road, and/or the trailer angular velocity in relation to the road, is determined based on signals from an object sensor mounted on the trailer.

5. The method according to claim 4, wherein the object sensor is arranged to detect spatial features externally of the trailer.

6. The method according to claim 4, wherein the object sensor is a camera, and the signals represent at least one image.

7. The method according to claim 1, wherein the trailer orientation in relation to the road, and/or the trailer angular velocity in relation to the road, is determined based on signals from an object sensor mounted on the tractor, and based on signals from at least one articulation sensor, which articulation sensor signals represent a respective angle of at least one articulated joint between the tractor and the trailer.

8. The method according to claim 7, wherein the object sensor is arranged to detect spatial features externally of the tractor.

9. The method according to claim 7, wherein the object sensor is a camera, and the signals represent at least one image.

10. The method according to claim 1, wherein the vehicle comprises a plurality of trailers, and determining the trailer orientation and/or the trailer angular velocity comprises determining the orientation in relation to the road of the rearmost trailer, and/or the angular velocity in relation to the road of the rearmost trailer.

11. The method according to claim 1, wherein determining a position of the tractor in relation to the road comprises determining rates of changes of angles between a movement direction of the tractor and directions to near and far points ahead of the tractor.

12. A non-transitory computer readable medium carrying a computer program comprising program code for performing the steps of claim 1 when said program code is run on a computer.

13. A control unit configured to perform the steps of the method according to claim 1.

14. A vehicle comprising the control unit according to claim 13.

* * * * *